Patented Feb. 22, 1944

2,342,451

UNITED STATES PATENT OFFICE 2,342,451

CHROME DISAZO DYE

Boyce G. Carson, Woodstown, N. J., assignor to E. I. du Pont de Nemours & Company, Wilmington, Del., a corporation of Delaware No Drawing. Application May 29, 1941,
Serial No. 395,734

7 Claims. (Cl. 260—147)

This invention relates to new soluble chromable disazo dyes which are especially suitable for dyeing wool and similar dyeable fibers.

In the dyeing of olive drab shades on wool, mixtures of chromable wool dyes of various shades are commonly used, one of which gives dyeings primarily in shades of yellow to brown. Heretofore, there has not been available such a dye which has a satisfactory combination of properties which are needed for such dyeings, such as good light fastness, good carbonizing fastness and good fastness to severe washing and fulling. It was therefore desirable to provide dyes for the indicated purposes which have the desired combination of properties and which are made from readily available intermediates.

It is among the objects of the present invention to provide soluble chromable disazo dyes which dye wool and similar dyeable fibers in fast shades. Another object of the invention is to provide for making fast chromed dyeings on wool and similar dyeable fibers in various shades such as yellow, brown and red. Another object of the invention is to provide chromed dyes which have good fastness to light, washing, fulling and carbonizing. Other objects of the invention will be apparent from the following description.

The objects of the invention are attained by providing disazo dyes which are represented by the general formula R—N=N—Py—N=N—R'' wherein R is an aryl group containing in the ortho position to the azo bridge one of a lake forming group consisting of carboxy, —S—CH$_2$—COOH, —O—CH$_2$—COOH, wherein the aryl nucleus is one of a group consisting of the benzene and naphthalene series which is substituted by one of a group consisting of phenyl and (Y)$_n$ wherein Y is from a group consisting of hydrogen, alkyl having 1 to 4 carbons, the corresponding alkoxy groups, chloro, bromo, nitro, —SO$_3$H and —COOH and $n$ is an integer not greater than 2; Py is the residue of one of a group consisting of amino-aryl-pyrazolones and sulfo-amino-aryl-pyrazolones of the phenylene and naphthalene series in which the 3-position of the pyrazolone group is substituted by one of a group consisting of methyl, phenyl and —COOM wherein M is one of a group consisting of hydrogen, methyl and ethyl; and R'' is salicylic acid.

The dyes are made by diazotizing any of the above indicated mono-amino-aryl compounds of the benzene or naphthalene series which have a carboxy, —S—CH$_2$—COOH or —O—CH$_2$—COOH group ortho to the primary amino group, and coupling with a pyrazolone of the group consisting of the amino-aryl-pyrazolones and sulfo-amino-aryl-pyrazolones of the phenylene and naphthalene series in which the 3-position of the pyrazolone nucleus is substituted by methyl, phenyl, carboxy, methyl ester or ethyl ester group. The amino-substituted monazo compound thus obtained is then diazotized and coupled with any azo dye coupling component of the phenolic type which is devoid of primary amino groups. The resulting disazo dye is then separated from the coupling medium, as by salting and filtering out the precipitated product.

The disazo compounds thus produced are soluble in water and they produce direct dyeings on wool from hydrous solutions in yellowish shades. Upon chroming the dyeings by methods well known in the art, dyeings having good fastness properties in somewhat darker yellowish to reddish shades are produced. Instead of dyeing by the afterchrome process, equally good results are obtainable by applying the dyes in accordance with metachrome methods.

The invention will be more fully set forth in the following more detailed description which includes examples that are given as illustrative embodiments of the invention and not as limitations thereof. Parts are expressed in parts by weight unless otherwise noted.

EXAMPLE 1

Anthranilic acid (137.4 parts) is added to 1 liter of water and 91.2 parts of hydrogen chloride. The temperature of the mixture is lowered to 0–5° C. by the addition of ice, and sodium nitrite (70 parts dissolved in 300 parts of water) is added with rapid stirring. After diazotization is complete, a small amount of urea or sulfamic acid is added until the small excess of nitrous acid is destroyed. The diazotized solution is added slowly to a mixture of 192.5 parts of 1-(3'-aminophenyl)-3-methyl-5-pyrazolone and 265 parts of soda ash in 4000 parts of water at 0–5°. Coupling proceeds rapidly, and after it is complete the free amino group of the phenyl nucleus is diazotized by adding to the solution 182.4 parts of hydrogen chloride, followed by 70 parts of sodium nitrite dissolved in 300 parts of water. The second diazotization is preferably carried out at room temperature (20–25° C.). When the diazotization is complete, the diazo solution is added slowly to a solution of 152 parts of salicylic acid and 100 parts of caustic soda in 3000 parts of water at 0–5° C. When the coupling is complete, the dye is isolated from the cold solution by the addition of common salt, filtering, and drying. It dyes wool by the afterchrome or metachrome method a yellow shade having good fastness to light and excellent fastness to carbonizing, to fulling and to severe washing. Its properties make it especially suitable for use in mixtures for dyeing olive drab shades.

The compound is represented by the formula

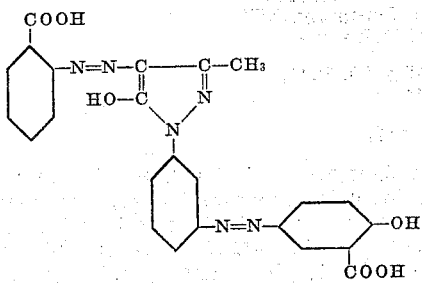

the procedure of Example 1, a yellow dye is obtained which has properties very similar to those of the dye obtained in Example 1.

The compound is represented by the formula

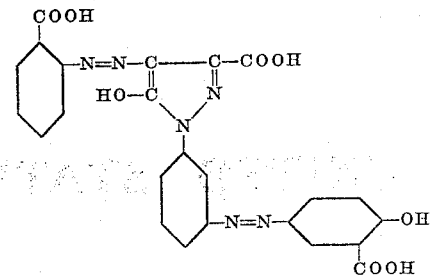

Dyeings on wool with the dyes of Examples 1 to 3 are surprisingly resistant to color change during carbonizing.

In the following Table I are shown other illustrative examples of the invention which were made in general by processes similar to the foregoing examples. Table I shows the components used in making the dyes, the shades of the direct dyeings on wool and the shades of the chromed dyeings. Excellent dyeings on wool having fastness properties similar to those of the foregoing examples can be made either by the metachrome or afterchrome process.

Table I

| No. | Diazo component | Middle coupling component | End coupling component | Direct color on wool | Chromed color on wool |
|---|---|---|---|---|---|
| 5 | 5-chloro-2-amino-benzoic acid | 1-(3'-aminophenyl)-3-methyl-5-pyrazolone. | Salicylic acid | Yellow | Yellow. |
| 6 | 6-chloro-2-amino-benzoic acid | do | do | do | Do. |
| 7 | Amino-terephthalic acid | do | do | do | Do. |
| 8 | Anthranilic acid | 1-(4'-aminophenyl)-3-methyl-5-pyrazolone. | do | do | Do. |
| 9 | do | do | 2,3-cresotinic acid | do | Do. |
| 10 | 5-chloro-2-amino-benzoic acid | do | Salicylic acid | do | Do. |
| 11 | 5-sulfo-2-amino-benzoic acid | 1-(3'-aminophenyl)-3-methyl-5-pyrazolone. | do | do | Do. |
| 12 | Anthranilic acid | 1-(3'-aminophenyl)-5-pyrazolone-3-carboxylic acid. | do | do | Do. |
| 13 | N-(3'-carboxy-4'-aminobenzenesulfonyl) anthranilic acid. | 1-(3'-aminophenyl)-3-methyl-5-pyrazolone. | do | do | Do. |
| 14 | do | 1-(3'-aminophenyl)-5-pyrazolone-3-carboxylic acid. | do | do | Do. |

EXAMPLE 2

By using an equivalent amount of aminophthalic acid instead of anthranilic acid in the procedure of Example 1, a very similar yellow chromable dye is obtained which has similar fastness properties when applied to wool by the usual afterchrome or metachrome methods.

The compound is represented by the formula

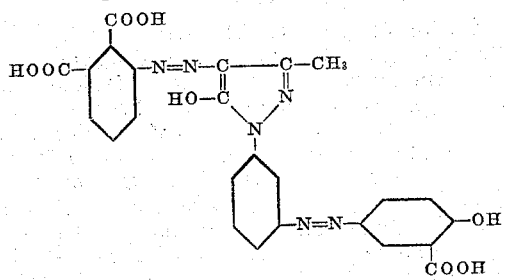

EXAMPLE 3

By using an equivalent amount of 1-(3'-aminophenyl)-5-pyrazolone-3-carboxylic acid instead of 1-(3'-aminophenyl)-3-methyl-5-pyrazolone in Primary arylamines of the benzene and naphthalene series having the above indicated lake-forming groups ortho to the primary amino group which are represented by the formula

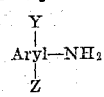

are used as the first components in making the new dyes. In this formula Z is one of the group consisting of —COOH, —O—CH₂COOH and S—CH₂COOH which is in an ortho position to the primary amino group; aryl is a benzene or naphthalene nucleus; and Y is phenyl or one to two members of a group consisting of hydrogen, alkyl having 1 to 4 carbons, the corresponding alkoxy groups, nitro, chloro, bromo, —SO₃H and —COOH.

As representative of the many primary arylamines of the benzene and naphthalene series which may be used as first components to make the new dyes are mentioned anthranilic acid, 3-chloro-anthranilic acid, 4-chloro-anthranilic acid, 5-chloro-anthranilic acid, 6-chloro-anthranilic acid, 4-sulfo-anthranilic acid, 5-sulfo-anthranilic acid, 5-sulfo-6-chloro-anthranilic acid, 3-aminophthalic acid, aminoterephthalic acid, 5-nitro-anthranilic acid, 4-bromo-anthranilic acid, 5-bromo-anthranilic acid, 6-bromo-anthranilic acid, 3,5-dichloro-anthranilic acid, 3,5-dibromo-anthranilic acid, 2-amino-isophthalic acid, 2-aminophenoxy acetic acid, 2-aminothiophenoxy acetic acid, 2-amino-5-ethoxy-thiophenoxy acetic acid, 2-amino-5-chloro-thiophenoxy acetic acid, 1-amino-2-naphthoxy-acetic acid, 1-amino-2-thionaphthoxy acetic acid, 2-amino-3-naphthoic acid, and similar aryl amines containing ortho lake-forming groups.

The first components are diazotized and coupled with one of the above described amino substituted aryl-pyrazolones. Representative members of the pyrazolones which are suitable as second components for making the dyes of the invention are 1-(3'-aminophenyl)-3-methyl-5-pyrazolone, 1-(4'-aminophenyl)-3-methyl-5-pyrazolone, 1-(3'-aminophenyl)-5-pyrazolone-3-carboxylic acid, 1-(3'-aminophenyl)-5-pyrazolone-3-carboxylic-methyl ester (or ethyl ester), 1-(4'-aminophenyl)-5-pyrazolone-3-carboxylic acid, 1-(4'-aminophenyl) - 5 - pyrazolone - 3 - carboxylic methyl (or ethyl) ester, 1-(3'-aminophenyl)-3-phenyl-5-pyrazolone, 1-(4' - aminophenyl) - 3 - phenyl-5-pyrazolone, 1-(4'-amino-6'-sulfo-naphthyl-1)-3-methyl-5-pyrazolone, 1-(4'-amino-6'-sulfo-naphthyl-1) - 5 - pyrazolone - 3 - carboxylic acid (or methyl or ethyl ester), 1-(4'-amino-7-sulfo-naphthyl-1)-3-methyl-5-pyrazolone and 1-(4'-amino-7'-sulfo-naphthyl-1)-5-pyrazolone-3-carboxylic acid (or methyl or ethyl ester).

The amino-substituted monazo compound resulting from the coupling of the first and second components is diazotized and coupled with salicylic acid.

The disazo combinations made in accordance with the foregoing description give chromed dyeings on wool of good light fastness, but the light fastness is slightly less than that of the chromed monazo dyes of corresponding shade that have the best light fastness. However, the monazo dyes of the best light fastness are in general not entirely satisfactory in respect to some other fastness property, such as severe washing, fulling or carbonizing. They are so fast to light that when fading occurs in a dyeing such as an olive drab wherein a yellow is used with dyes of other shade, the dyeing fades off-shade, in general toward the yellow. The dyes of the present invention provide dyeings having a better combination of all fastness properties than the monazo dyes. In a dye having the excellent combination of other fastness properties, it is desirable to have slightly less light fastness than that of the most light fast monazo dyes in order that the dyeings will fade on shade when fading occurs. In general the new dyes have good fastness to carbonizing and washing, and the fastness to carbonizing and washing of some members of the type is superior. Many of the new dyes withstand the most severe fulling tests and all of them are satisfactory.

From the foregoing disclosure it will be recognized that the invention is susceptible of modification without departing from the spirit and scope thereof and it is to be understood that the invention is not restricted to the specific illustrations thereof herein set forth.

I claim:

1. A chromable disazo dye which in the form of its acid is represented by the formula

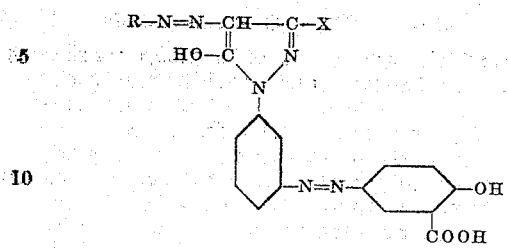

wherein R is an aryl nucleus containing in the ortho position to the azo bridge one of a lake-forming group consisting of carboxy, —S—CH$_2$—COOH, —O—CH$_2$—COOH, wherein the aryl nucleus is one of a group consisting of the benzene and naphthalene series which is substituted by one of a group consisting of phenyl and (Y)$_n$ wherein Y is from a group consisting of hydrogen, alkyl having 1 to 4 carbons, the corresponding alkoxy groups, chloro, bromo, nitro, —SO$_3$H and —COOH and $n$ is an integer not greater than 2; and X is one of a group consisting of methyl, phenyl and —COOM wherein M is one of a group consisting of hydrogen, methyl and ethyl.

2. The disazo dye which in its acid form is represented by the formula

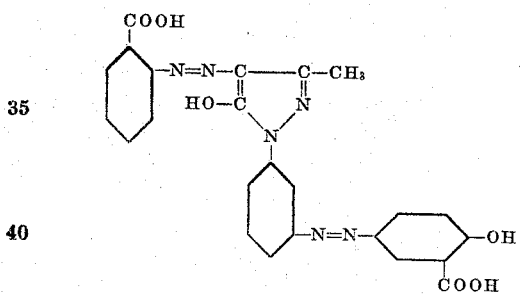

3. The disazo dye which in its acid form is represented by the formula

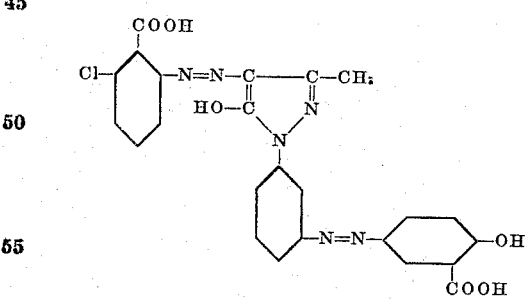

4. The disazo dye which in its acid form is represented by the formula

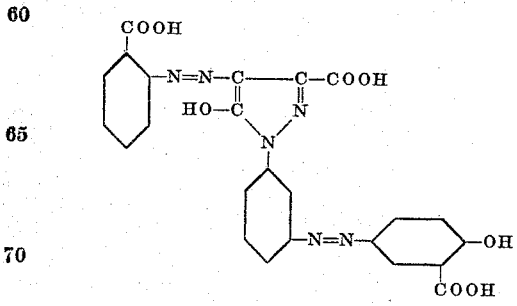

5. The process of making a chromable disazo dye which comprises diazotizing a mono-amino-aryl compound which has a lake-forming group ortho to the amino group of the class consisting of carboxy,

—S—CH₂—COOH, —O—CH₂—COOH and in which aryl is one of a group consisting of the benzene and naphthalene series which is substituted by one of a group consisting of phenyl and —(Y)$_n$ wherein Y is one of a group consisting of hydrogen, alkyl having 1 to 4 carbons, the corresponding alkoxy groups, chloro, bromo, nitro, —SO₃H and —COOH, and $n$ is an integer not greater than 2; coupling with a compound of a group consisting of amino-aryl-pyrazolones and sulfo-amino-aryl-pyrazolones of the benzene and naphthalene series in which the 3-position of the pyrazolone group is substituted by one of a group consisting of methyl, phenyl and —COOM wherein M is one of a group consisting of hydrogen, methyl and ethyl; diazotizing the resulting monazo compound and then coupling with salicylic acid.

6. The process in accordance with claim 5 wherein the first coupling is made with 1-(3'-aminophenyl)-3-methyl-5-pyrazolone.

7. The process in accordance with claim 5 wherein the first coupling is made with 1-(3'-aminophenyl)-5-pyrazolone-3-carboxylic acid.

BOYCE G. CARSON.